United States Patent [19]
Beasley

[11] 3,741,105
[45] June 26, 1973

[54] STRIPPER MEANS FOR MEAT SKINNING MACHINES

[75] Inventor: Donald L. Beasley, Des Moines, Iowa

[73] Assignee: Townsend Engineering Company, Des Moines, Iowa

[22] Filed: Sept. 3, 1971

[21] Appl. No.: 177,798

[52] U.S. Cl............................................ 99/589, 83/4
[51] Int. Cl............................................ A22c 17/12
[58] Field of Search........................ 146/130; 99/589

[56] References Cited
UNITED STATES PATENTS

| R23,222 | 4/1950 | Townsend | 146/130 |
| 1,347,237 | 7/1920 | Waddington | 146/130 X |

*Primary Examiner*—Willie G. Abercrombie
*Attorney*—Zarley, McKee & Thomte

[57] ABSTRACT

A stripper means for meat skinning machines is disclosed herein. The machine includes a driven toothed roll which is rotatably mounted on a frame means adjacent one end of a feed table. A pressure shoe means extends around a portion of the driven roll and has a skinning blade extending therefrom for severing the skin from the meat product as the product is moved thereby. The driven roll is provided with a plurality of spaced apart annular grooves formed in the peripheral surface thereof. A stripping shaft is mounted on the frame means below the driven roll and has a plurality of plastic stripping blades detachably mounted thereon in a spaced apart relationship. Each of the stripper blades has a concave upper end portion which is received in the grooves of the driven roll. The stripping blades strip the severed skin from the driven roll and will break if an extremely strong piece of skin becomes entangled in the driven roll. The ability of the stripping blades to fracture insures that the expensive driven roll will not be damaged by the stripping blades.

8 Claims, 5 Drawing Figures

PATENTED JUN 26 1973
3,741,105
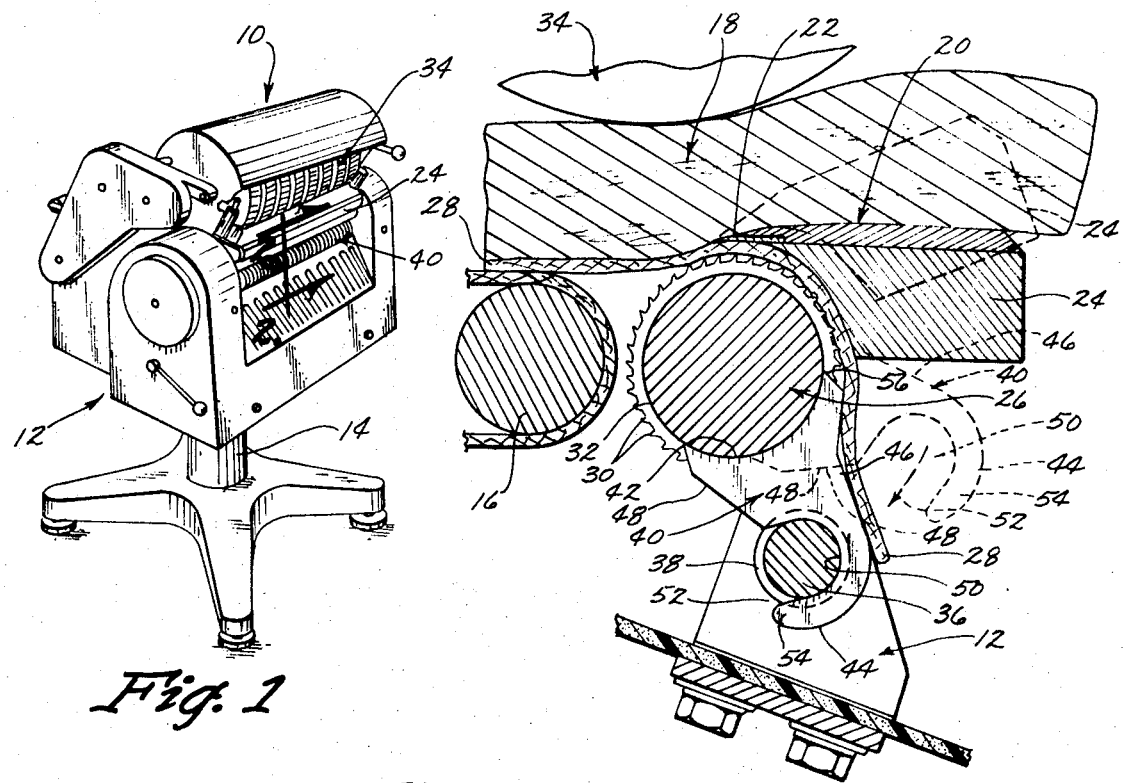
Fig. 1
Fig. 2
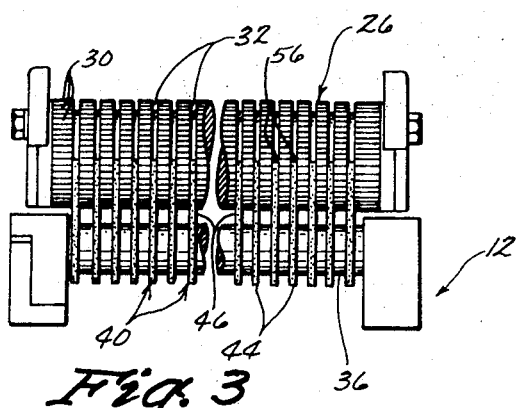
Fig. 3
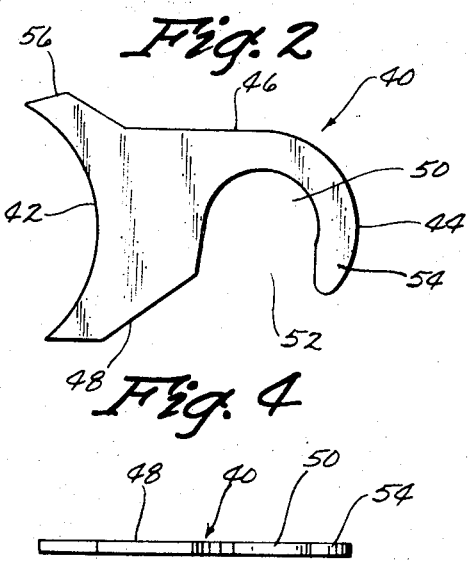
Fig. 4
Fig. 5
INVENTOR
DONALD L. BEASLEY
BY
Zarley, McKee & Thomte
ATTORNEYS

STRIPPER MEANS FOR MEAT SKINNING MACHINES

Skinning machines such as those described in Reissue No. Re. 23,222; U. S. Pat. No. 2,522,728; and U. S. Pat. No. 2,912,027 are employed to remove the skins from meat products. Generally speaking, the skinning machines are provided with a driven toothed roller rotatably mounted on a frame means adjacent one end of a feed tray or the like. A pressure shoe means having a skinning blade mounted thereon is movably mounted on the frame means and is adapted to sever the skin from the meat product with the severed skin passing between the toothed roll and the pressure shoe means. Certain of the previous machines employed metal stripping fingers which had one end positioned closely adjacent the toothed roll to aid in separating the severed skin from the toothed roll. If an extremely tough piece of skin was encountered by the previous machines, damage would sometimes occur to the toothed roll since the skin would tend to bend the metal stripping fingers and engagement of the bent stripping fingers with the toothed roll frequently caused considerable damage to the expensive toothed roll. Additionally, the metal stripping fingers were ordinarily welded to a support member and the replacement or repair of one of the stripping fingers involved considerable time and expense.

Therefore, it is a principal object of this invention to provide a stripping means for a meat skinning machine.

A further object of this invention is to provide a stripper means for meat skinning machines comprising a plurality of spaced apart plastic stripper blades which are adapted to separate the severed skin from the driven roll.

A further object of this invention is to provide a stripper means for meat skinning machines comprising a plurality of plastic stripper blades which are individually detachably secured to a stripper shaft thereby reducing maintenance time and expense.

A further object of this invention is to provide a stripper means for meat skinning machines comprising a plurality of stripper blades which are designed to fracture to prevent damage to the driven roll.

A further object of this invention is to provide a stripping means for meat skinning machines which is efficient in operation.

A further object of this invention is to provide a stripping means for meat skinning machines which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of a meat skinning machine;

FIG. 2 is an enlarged sectional view seen along lines 2—2 of FIG. 1, the broken lines indicating the manner in which the stripping blades are detachably secured to the stripping shaft;

FIG. 3 is a fragmentary front elevational view of the toothed roll and the stripping means of this invention;

FIG. 4 is a side view of one of the stripping blades; and

FIG. 5 is an end view of the stripping blade of FIG. 4.

Referring to the drawings, the numeral 10 generally designates a skinning machine substantially conventional in design and is of the type manufactured by Townsend Engineering Company of Des Moines, Iowa. The machine 10 generally comprises a frame means 12 mounted on a pedestal 14. A feed conveyor means 16 is mounted on the frame means 12 for moving the product 18 towards the skinning blade means 20. While it is preferred that a feed conveyor means such as the conveyor means 16 be provided, an inclined feed table may be substituted therefor such as disclosed in U. S. Pat. No. 2,912,027.

Skinning blade means 20 includes a blade 22 which extends from the leading edge of a pressure shoe 24 which is movably mounted on the frame means 12 in conventional fashion so that the shoe may "float" with respect to the driven or toothed roll 26 which is rotatably mounted on the frame means 12. The purpose of the toothed roll 26 is to aid in removing the skin 28 from the meat product 18 after it has been severed therefrom by the skinning blade 22. The toothed roll 26 also aids in pulling the meat product towards the skinning blade 22. The toothed roll 26 pulls the severed portion of the skin 28 downwardly from the blade 22 in conventional fashion between the roll 26 and the pressure shoe 24. Roll 26 is provided with a serrated peripheral surface or teeth 30 which project therefrom for gripping the skin. Roll 26 is also provided with a plurality of spaced apart annular grooves 32 formed therein which extend inwardly from the peripheral surface thereof. The numeral 34 refers generally to a hold down attachment adapted to engage the meat product being skinned so that the product is stretched in two lateral directions as the product is being skinned to maintain the bottom of the product in a straight or horizontal condition to enhance the skinning operation.

A stripper shaft 36 is mounted on the frame means 12 below the roll 26 as indicated in the drawings and is provided with a plurality of spaced apart annular grooves 38 formed therein which extend into the peripheral surface thereof. The grooves 38 are aligned with the grooves 32 in the roll 26. A plurality of stripping blades 40 are detachably mounted on the stripping shaft 36 and are preferably comprised of a plastic material such as Delrin. Blade 40 comprises a flat member having a concave upper end portion 42, lower end 44, side edge 46 and side edge 48. The concave upper end portion 42 is receivable in one of the grooves 32 and is complementary in shape to the roll 26 as clearly illustrated in FIG. 2. Blade 40 is provided with a substantially semi-circular opening 50 formed therein which communicates with opening 52 extending outwardly through side edge 48 as illustrated in FIG. 4. The semi-circular opening 50 is slightly more than 180° and is adapted to be received by one of the grooves 38 in the stripping shaft 36 as illustrated in FIG. 2. The fact that the semi-circular opening 50 is slightly greater than 180° permits the opening 50 to extend around slightly more than one-half of the circumference of the shaft 36 so that the blade 40 is "snapped" onto the shaft since the flexible characteristics of the blade 40 permit the hook portion 54 to be deflected to permit the attachment of the blade to the shaft 36. Blade 40 is provided with a beveled edge portion 56 which aids in separating the skin 28 from the roll 26.

In operation, the blades 40 are mounted on the shaft 36 by placing the concave upper end portion 42 in the groove 32 and then rotating the blade 40 downwardly as illustrated by broken lines in FIG. 2 so that the shaft 38 is received in the opening 50. The blade 22 severs the skin 28 from the product 18 with the roll 26 pulling the severed portion of the skin downwardly between the roll 26 and the pressure shoe 24. The blades 40 engage the severed portion of the skin 28 as shown in FIG. 2 and separate the severed portion of the skin 28 from the roll 26 so that the skin will not wrap around the rotating roll 26.

If an extremely tough piece of skin is encountered, one or more of the blades 40 will fracture and the fact that the blades will fracture prevents damage from occurring to the expensive roll 26. If metal stripping blades were utilized, the extremely tough skin just described would possibly cause the blades to bend and the bent stripping blades could engage the periphery of the roll 26 and damage the same. It is very easy to replace the blades 40 by simply pulling the blade 40 out of engagement with the shaft 36. The blades 40 can be individually replaced without disassembling the machine and such a feature reduces maintenance time and expense.

Thus it can be seen that an extremely novel stripping means has been provided for a skinning machine which effectively removes the severed portion of the skin from a toothed roll and which prevents damage to the roll if an extremely tough skin is encountered. Thus it can be seen that the invention accomplishes at least all of its stated objectives.

I claim:

1. In a device of the class described, a frame means,
a driven roll rotatably mounted on said frame means, said driven roll having a plurality of spaced apart annular grooves formed therein which extend inwardly into the peripheral surface thereof,
a pressure shoe means on said frame means extending around a portion of said driven roll,
a skinning blade projecting from said pressure shoe means for severing the skin from the product being skinned, the severed skin being gripped by said driven roll and being passed between the periphery of said driven roll and said pressure shoe means,
a stripper shaft on said frame means below said driven roll,
a plurality of stripper blades detachably secured to said stripper shaft in a spaced apart relationship, each of said stripper blades having a concave end portion which is received in one of said grooves in said driven roll whereby said stripper blades will strip the severed skin from said driven roll,
said stripper blades being comprised of a plastic material,
said stripper shaft having a plurality of spaced apart annular grooves formed therein which extend inwardly into the peripheral surface thereof which are aligned with the grooves in said driven roll, said stripper blades each having a substantially semi-circular opening formed therein which is detachably received by one of the grooves in said stripper shaft.

2. In a device of the class described,
a frame means,
a driven roll rotatably mounted on said frame means, said driven roll having a plurality of spaced apart annular grooves formed therein which extend inwardly into the peripheral surface thereof,
a pressure shoe means on said frame means extending around a portion of said driven roll,
a skinning blade projecting from said pressure shoe means for severing the skin from the product being skinned, the severed skin being gripped by said driven roll and being passed between the peripheries of said driven roll and said pressure shoe means,
a stripper shaft on said frame means below said driven roll,
a plurality of stripper blades detachably secured to said stripper shaft in a spaced apart relationship, each of said stripper blades having a concave end portion which is received in one of said grooves in said driven roll whereby said stripper blades will strip the severed skin from said driven roll,
each of said stripper blades being individually detachably secured to said stripper shaft so that any of said stripper blades may be removed from said stripper shaft without removing the other of said stripper blades.

3. The device of claim 2 wherein said stripper blades are comprised of a thin plastic material which is fracturable upon encountering said driven roll.

4. The device of claim 1 wherein said substantially semi-circular opening in each of said stripper blades is greater than 180° so that more than one-half of the circumference of said groove in said stripper shaft is embraced.

5. The device of claim 4 wherein each of said stripper blades has an arcuate hook portion which defines said substantially semi-circular opening.

6. The device of claim 4 wherein each of said stripper blades comprises a flat member having upper and lower ends, first and second side edges and opposite sides, said concave end portion being at the upper end of said blade, said substantially semi-circular opening extending into said blade from one of said side edges adjacent the lower end thereof.

7. The device of claim 6 wherein each of said stripper blades has a beveled stripping portion provided at the upper end of the other of said side edges adjacent said concave end portion which engages the severed skin to aid in separating the severed skin from said driven roll.

8. In a device of the class described,
a frame means,
a driven roll rotatably mounted on said frame means, said driven roll having a plurality of spaced apart annular grooves formed therein which extend inwardly into the peripheral surface thereof,
a pressure shoe means on said frame means extending around a portion of said driven roll,
a skinning blade projecting from said pressure shoe means for severing the skin from the product being skinned, the severed skin being gripped by said driven roll and being passed between the periphery of said driven roll and said pressure shoe means,
a stripper shaft on said frame means below said driven roll,
a plurality of flexible resilient stripper blades individually detachably secured to said stripper shaft in spaced apart relationship, each of said stripper blades having a portion which is received in one of said grooves in said driven roll whereby said stripper blades will strip the severed skin from said driven roll.

* * * * *